US005306110A

United States Patent [19]

Cline

[11] Patent Number: 5,306,110

[45] Date of Patent: Apr. 26, 1994

[54] APPARATUS FOR DUMPING THE CONTENTS OF A DRUM

[76] Inventor: Marion Cline, R.D. 1, Blairsville, Pa. 15717

[21] Appl. No.: 888,014

[22] Filed: May 26, 1992

[51] Int. Cl.[5] .............................................. B65G 65/23

[52] U.S. Cl. .................................... 414/424; 414/607; 414/647

[58] Field of Search ............... 414/404, 420, 422, 424, 414/607, 608, 642, 786, 645-647, 652-656

[56] References Cited

U.S. PATENT DOCUMENTS

| | | | |
|---|---|---|---|
| 1,628,389 | 5/1927 | Cochran | 414/647 X |
| 2,458,949 | 1/1949 | Lull | 414/647 |
| 2,482,692 | 9/1949 | Quales et al. | 414/647 X |
| 2,738,222 | 3/1956 | Needham | 414/607 X |
| 3,881,617 | 5/1975 | Miller et al. | 414/422 |
| 3,893,579 | 7/1975 | Glewwe | 414/607 X |
| 4,385,860 | 5/1983 | Corbin | 474/424 X |
| 4,405,278 | 9/1983 | Kvalheim | 414/424 X |

FOREIGN PATENT DOCUMENTS

| | | | |
|---|---|---|---|
| 0257925 | 3/1988 | European Pat. Off. | 414/422 |
| 2064523 | 7/1972 | Fed. Rep. of Germany | 414/647 |
| 2396710 | 3/1979 | France | 414/608 |
| 2557868 | 7/1985 | France | 414/607 |
| 1444252 | 7/1976 | United Kingdom | 414/607 |

*Primary Examiner*—David A. Bucci

*Attorney, Agent, or Firm*—Jacobson, Price, Holman & Stern

[57] ABSTRACT

Apparatus for dumping the contents of a container, for example, a drum, includes a first frame for receiving tines of a fork lift, a second frame for receiving a drum pivotally mounted on the first frame and a latch secured to the second frame. The latch is held by a normally extended spring in a first position latching the first frame and the second frame together. The latch includes a latch pin which extends downward below the bottom of the drum when the drum is raised from the ground for emptying. The raised drum is moved forward into position so that the latch pin engages an upper edge of a receptacle for receiving contents of the drum. As the raised drum is moved further forward with the latch pin still engaging the upper edge of the receptacle, the latch moves into a second position compressing the spring and releasing the second frame from latched engagement with the first frame. This allows the drum to pivot on the first frame to an inverted position for emptying. The inverted drum is moved rearward until its open edge strikes the upper edge of the receptacle and the drum is rotated thereabout until it regains an upright latched position. A method for using the apparatus is also described.

10 Claims, 3 Drawing Sheets

APPARATUS FOR DUMPING THE CONTENTS OF A DRUM

FIELD OF THE INVENTION

The invention relates to a device for attaching to a drum which allows the drum to be inverted for dumping the contents, and to be reversed to an upright position.

BACKGROUND OF THE INVENTION

There has long been a need for a simple, economical device for raising and inverting a container such as a steel drum, for dumping the contents, and for reversing the container to the original position.

Corbin U.S. Pat. No. 4,385,860, describes a drum dumping attachment for a fork lift truck in which the drum is caused to pivot by engagement of a forwardly projecting finger with the rim of a receptacle for the drum contents. Locking pins, which are manually removable, prevent unwanted pivoting. The receptacle must have a rearwardly projecting tripping projection on its upper edge to engage the forwardly projecting finger on the device.

Glewwe, U.S. Pat. No. 3,893,579, and Kvalheim, U.S. Pat. No. 4,405,278, describe devices which are not simple. The Glewwe device is attached to a fork lift truck. Kvalheim describes a self-emptying dump box which engages a bracket attached to an upper edge of the receptacle for the contents of the dump box.

SUMMARY OF THE INVENTION

Apparatus for dumping the contents of a container, for example, a drum, includes a first frame for receiving tines of a fork lift, a second frame for engaging the drum pivotally mounted on the first frame and a latch securing the frames together before dumping. The latch is held by a normally extended spring in a first position latching the first frame and the second frame together. When the spring is compressed, the latch is released for separation of the frames, allowing the drum to pivot to the inverted position for emptying. The latch includes an elongated latch pin which extends downward below the bottom of the drum when the drum is raised from the ground for emptying.

The raised drum, with the latch in the first position, is moved forward into position so that the extended latch pin engages an outer upper edge of a receptacle for receiving the contents of the drum and, as the raised drum is moved further forward with the latch pin still engaging the upper edge of the receptacle, the latch moves into the second position, compressing the spring and releasing the second frame from latched engagement with the first frame. This allows the drum to pivot on the first frame to an inverted position for emptying.

The inverted drum is moved rearward until its open edge strikes the inner upper edge of the receptacle and the drum is rotated about the upper edge of the receptacle until it regains an upright latched position. A method for using the apparatus is also described.

An object of the invention is to provide a simple, economical apparatus for inverting a container for emptying and for reversing the emptied container to an upright position ready for reuse.

DETAILED DESCRIPTION OF THE INVENTION

The apparatus for dumping the contents of a container overcomes the disadvantages of the prior art by providing a simple, economical apparatus with very few moving parts.

The container illustrated and discussed herein, in non-limiting example, is a drum. It will be understood by one skilled in the art that the apparatus of the invention may be adapted, within the scope of the invention, for use with many shapes and types of container. In a preferred use, the container is a drum, for example a steel drum.

Tines of a fork lift are entered into a first frame to which a second frame holding the container (such as a drum) to be dumped is pivoted. When the first frame is raised (also raising the second frame and the drum), an elongated latch pin falls by gravity to extend below the lower edge of the first frame. The latch pin is retained in a latch body which is held in latched position holding the first frame and the second frame together by a normally extended spring.

The raised drum is moved forward into position so that the extended portion of the latch pin strikes an upper outer edge of a receptacle into which the drum is to be emptied. As the drum is moved further forward with the latch pin engaged against the edge of the receptacle, the latch body is moved rearward to compress the spring, thus releasing the latch body and the second frame from latched engagement with the first frame, allowing the second frame to pivot about the first frame and allowing the drum to rotate. As the drum rotates, the normally extended spring urges the latch body back into its latched position. The drum rotates until it is inverted and the contents emptied.

The inverted drum is moved rearward until the edge of the drum strikes the upper inner edge of the receptacle. As the drum is moved further rearward, the drum rotates against the upper edge of the receptacle until it reaches substantially upright position. The drum is then lowered to the ground and the latch pin retracts to a recessed position in the latch body.

With reference to the figures, in which like numerals represent like parts, FIGS. 1 through 5 illustrate apparatus of the invention for dumping the contents of a drum or other container.

Figure 1:
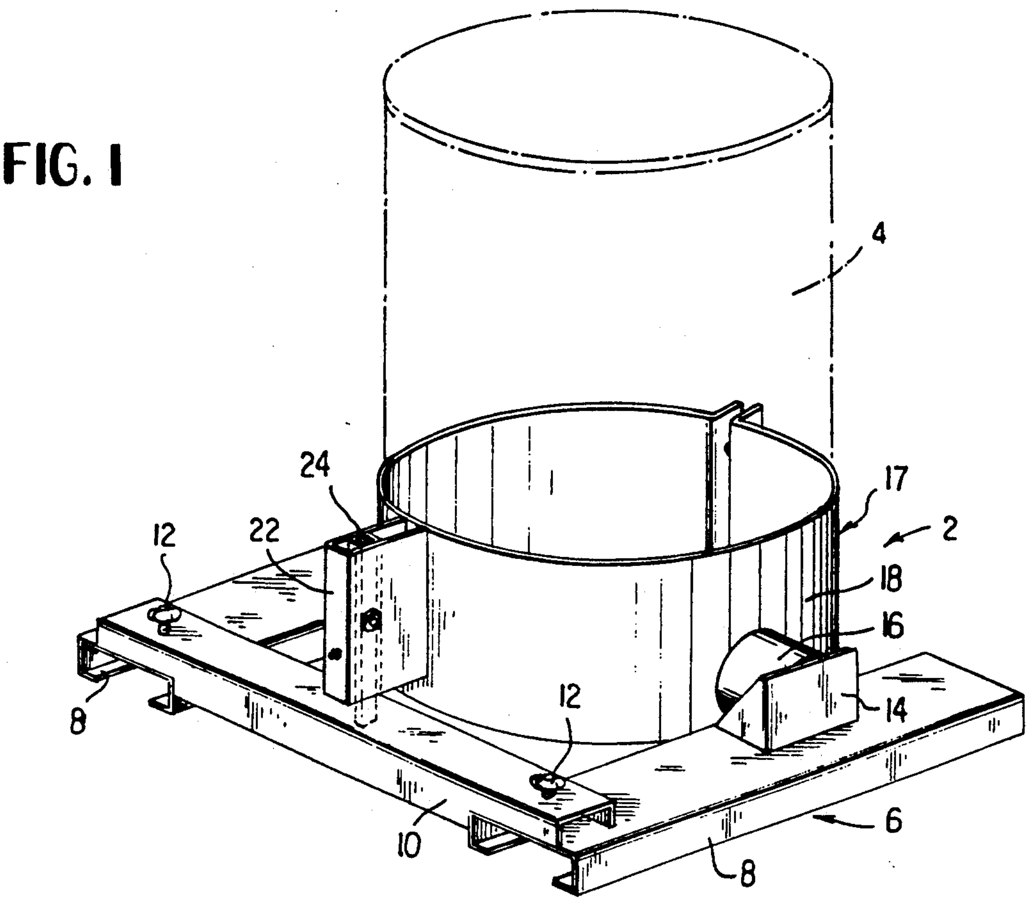
FIG. 1 is a perspective view of an apparatus for dumping containers according to the invention.
Figure 2:
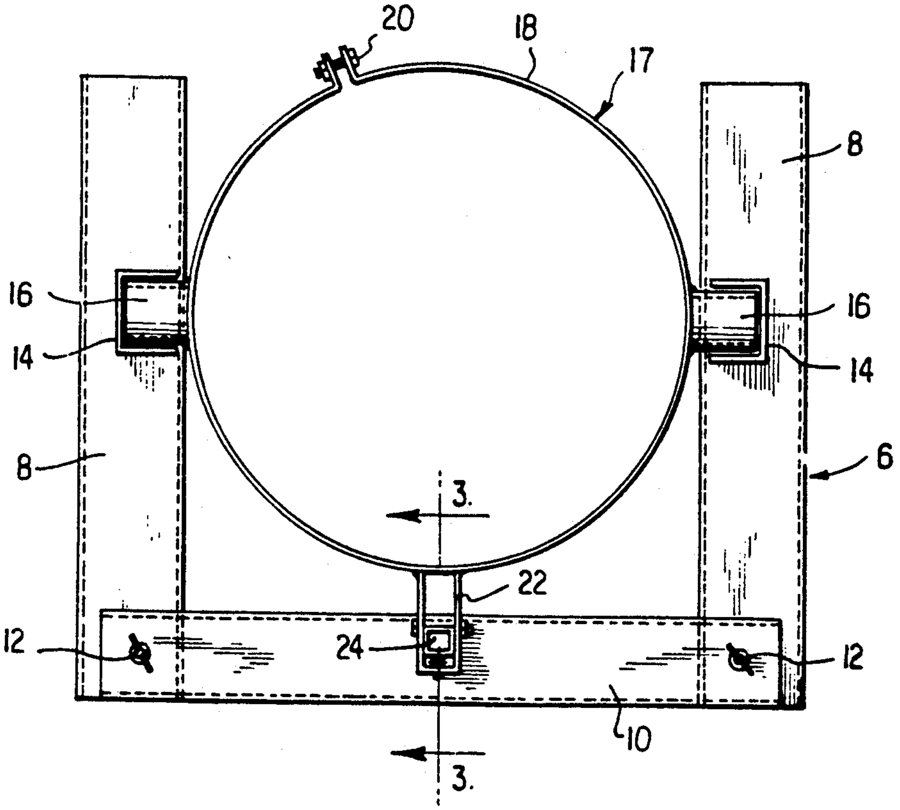
FIG. 2 is a top view of the apparatus of FIG. 1.

FIGS. 1 and 2 show device 2 having drum 4 held therein shown in phantom. First frame 6 includes a pair of fork pockets 8 for receiving tines of a fork lift connected by frame member 10 which extends between fork pockets 8. Screws 12 extend through frame member 10 for tightening against fork tines entered into fork pockets 8, for safety. Each fork pocket 8 includes a socket 14 on its upper surface for receiving a pivot member 16 of second frame 17. Pivot members 16 are attached at diametrically opposite positions to collar 18 which is fastened tightly around drum 4 by fastenings 20. When drum 4 is emptied, the drum rotates about pivot members 16 until inverted for emptying.

Attached to collar 18 is duct 22 which rests on frame member 10 when drum 4 is fastened in collar 18. Latch body 24 is hinged to duct 22 by hinge pin 25, shown in FIGS. 3 and 4. Latch member 26 is attached to an outer surface of latch body 24. Latch body 24 extends through aperture 28 in frame member 10 and latch member 26 engages against portion 30 of frame member 10, in latched position securing first frame 6 and second frame 17 together.

Latch pin 32 is retained in latch body 24 by stop 34 (attached to the latch pin) which moves in slot 36 according to the position and orientation of the drum. Latch body 24 rests in upright orientation against normally extended spring 38 with latch pin 32 engaged against portion 30 of frame member 10. In released position, latch body 24 compresses spring 38 and first frame 6 is released from engagement with second frame 17.

Figure 3:
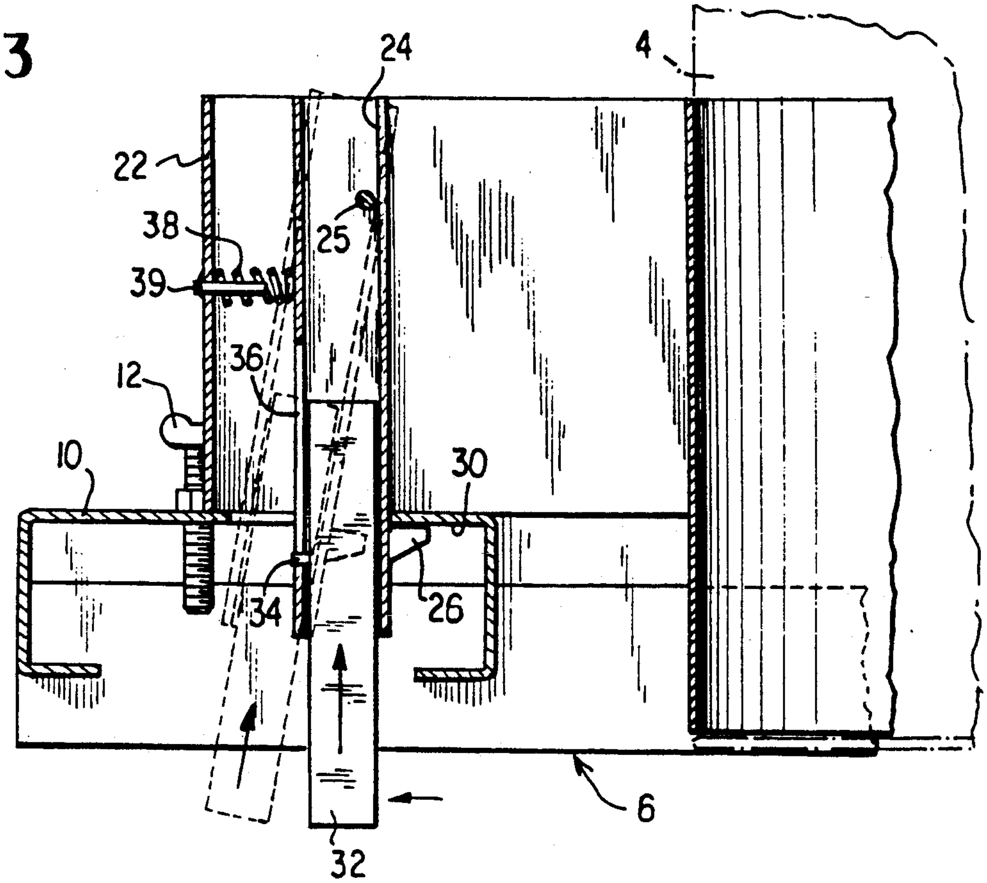
FIG. 3 is a cross-sectional view, taken on line 3—3 of FIG. 2, showing the latch retained on the first frame.
Figure 4:
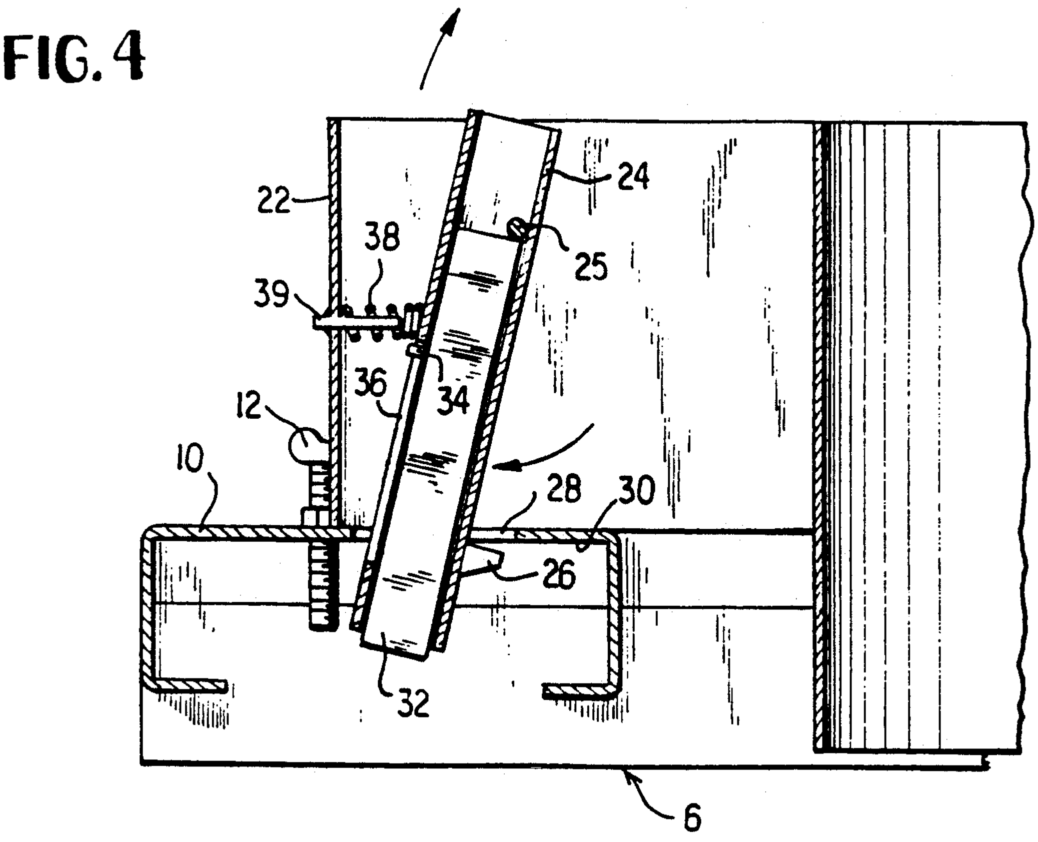
FIG. 4 is a view similar to FIG. 3 showing the latch released from the first frame.
Figure 5C:
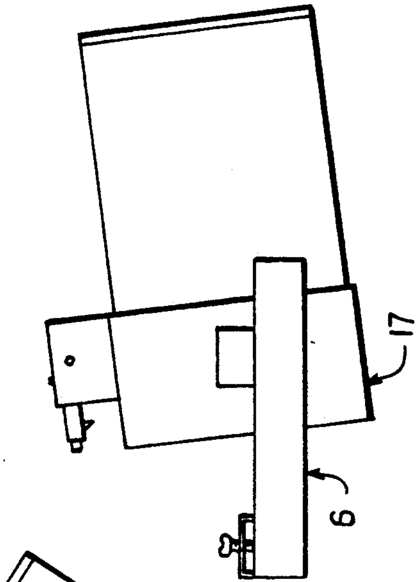
FIGS. 5*a* through 5*e* are schematic views illustrating the dumping apparatus in use.
Figure 5B:
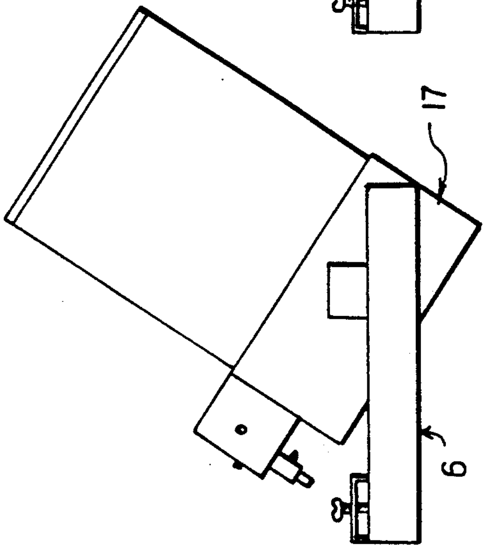
Figure 5A:
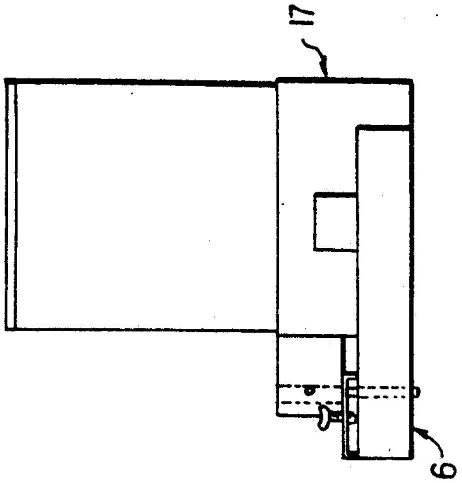
Figure 5E:
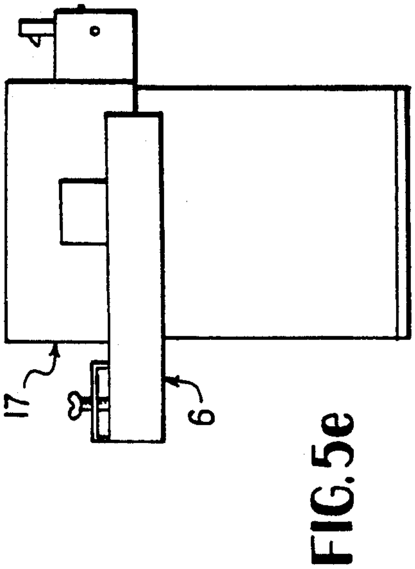
Figure 5D:
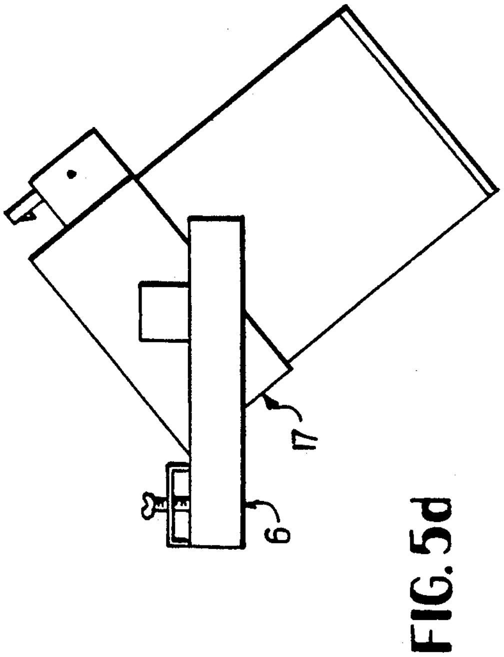

When drum 4, held in collar 22, rests normally on the ground, latch member 26 engages surface 30 of frame member 10 and latch pin 32 is recessed within latch body 24. When the drum is raised by a fork lift having tines entered into channels 8, latch pin 32 drops downward to extend below the level of the base of second frame 17, as shown in FIG. 3.

FIGS. 5*a* through 5*e* illustrate the rotation of the drum for emptying. To empty a full drum held in device 2, a fork lift engages fork pockets 8 of first frame 6 and screws 12 are tightened. The fork lift raises first frame 6 and second frame 17 (including drum 4 and its contents to be emptied) a few inches above the ground to allow latch pin 32 to drop down to its lowest position, about 2 to 4 inches below the bottom of fork pockets 8. The drum is then moved forward, with the lower end of latch pin 32 just above the ground, to adjacent a receptacle, such as a dumpster, hopper or truck, into which the contents of the drum are to be dumped. The drum is raised until the bottom of the fork pockets just clear the upper edge of the forward wall of the dumpster and is then slowly moved forward until latch pin 32 strikes the edge of the wall. As the drum is moved forward, the lower end of latch pin 32 is forced rearward and latch body 24 is forced against normally extended spring 38 and stop pin 39 to the position shown in phantom in FIG. 3. Latch member 26 is released from surface 30, drum 4 rotates forward about pivot members 16 and the contents are dumped into the container.

The drum is then raised until the open edge of the inverted drum is about 6 inches below the top of the forward wall of the dumpster. The drum is moved rearward until the edge of the drum strikes the wall. As the forks are moved further rearward and then lower, the drum is rotated about the upper edge of the container, into upright position. Latch body 24 automatically moves into latched position with latch member 26 against surface 30 of frame member 10. The drum is lowered to the ground and replaced ready for use. The forks are withdrawn from the fork pockets.

While the invention has been described with respect to certain embodiments thereof, it will be appreciated that variations and modifications may be made without departing from the spirit and scope of the invention.

What is claimed is:

1. Apparatus for dumping the contents of a drum comprising:

a first frame for receiving tines of a fork lift;

a second frame for receiving a drum pivotally mounted on said first frame;

spring-loaded latch means on said second frame having a first position latching said first frame and said second frame together and extending downward below said first frame for engaging an upper edge of a receptacle for receiving contents of the drum, and having a second position released from said first frame enabling the drum held by said second frame to be pivoted on said first frame to an inverted position for emptying, said second frame comprising means for holding the drum securely thereon, said holding means comprising a band encircling a lower portion of said drum, said holding means further comprising said pivoting means, said holding means further comprising said latch means, said latch means comprising a latch pin extending below a lower edge of the drum held in the holding means.

2. Apparatus according to claim 1 wherein said latch means comprises a latch body for receiving said latch pin and a latch member on said latch body wherein, in said first position, said latch member is retained by said first frame and, in said second position, said latch member is released from engagement with said first frame.

3. Apparatus according to claim 2 wherein said latch means is adapted for enabling said latch pin to be extended below the bottom of the drum when the drum is raised from the ground and is in upright position.

4. Apparatus according to claim 3 wherein said latch means further comprises a spring, wherein said spring is in normally extended condition when said latch means is in said first position and wherein said spring is in compressed condition when said latch means is in said second position.

5. An apparatus for dumping material from a container having discharge means adjacent an upper end thereof, said apparatus comprising a support frame, means on said support frame for supporting engagement with a lift device capable of moving the support frame vertically and laterally, a pivotal frame supported from said support frame, means on said pivotal frame to fixedly support a container thereon, means supporting the pivotal frame from said support frame to enable the pivotal frame to pivot from a position with the container upright to a position with the discharge means of the container in a position for dumping material from the container through the discharge means, and latch means locking said pivotal frame to said support frame in a position with the container upright, said latch means including a movable latch member mounted on one of said frames and including an actuator depending below said frames and the container when in upright position, said actuator engaging a release means associ7 ated with a receptacle for receiving material from the container with the actuator being engaged by the release means when the frames and container are lifted vertically and moved laterally toward the receptacle for releasing the pivotal frame and enabling pivotal movement of the container to a position to dump material from the discharge means into the receptacle for receiving material from the container when the container pivots to a position to dump material through the discharge means, said latch means being mounted on said pivotal frame, said latch member being engageable with keeper means on said support frame, said actuator for the latch means being movably mounted from said latch member for movement upwardly toward said support frame without releasing the latch member from said keeper means when the support frame is supported on a supporting surface to enable material to be placed in the container with the latch means retaining the pivotal frame in a position to support the container in upright position.

6. The apparatus as defined in claim 5 wherein said latch means includes a support structure rigid with said pivotal frame and projecting therefrom to engage a stop surface on said support frame to prevent movement of said pivotal frame in a direction opposite to the direction of pivotal movement prevented by said latch member engaging said keeper means on said support frame.

7. The apparatus as defined in claim 6 wherein said latch member and actuator are telescopically associated to enable the actuator to move upwardly in relation to the latch member when the actuator engages a supporting surface when the lift device lowers the support frame to supportingly engage a supporting surface.

8. The apparatus as defined in claim 5 wherein said means on the pivotal frame to support the container thereon includes clamp means engaging the container below a vertical center of the container whereby the container will pivot from an upright position to a dumping position due to the force of gravity pivoting the container about the pivotal axis between the pivotal frame and support frame.

9. The apparatus as defined in claim 8 wherein said means on the support frame for supporting engagement with a lift device includes means receiving the tines and detachably securing the support frame to the tines of a fork lift vehicle.

10. The apparatus as defined in claim 5 wherein said actuator and latch member are moved in response to horizontal movement of said support frame toward an open topped receptacle receiving material from the container when the container pivots to a dumping posi7 tion, said release means being an edge of the open topped receptacle.

* * * * *